US006220287B1

(12) United States Patent
Wolf

(10) Patent No.: US 6,220,287 B1
(45) Date of Patent: Apr. 24, 2001

(54) BAFFLE FOR SUPPRESSING SLOSH IN A TANK AND A TANK FOR INCORPORATING SAME

(75) Inventor: Lance Alan Wolf, Arlington, TN (US)

(73) Assignee: The Boeing Company, Seattle, WA (US)

( * ) Notice: Subject to any disclaimer, the term of this patent is extended or adjusted under 35 U.S.C. 154(b) by 0 days.

(21) Appl. No.: 09/497,776

(22) Filed: Feb. 3, 2000

(51) Int. Cl.$^7$ .................................................. B65D 90/52
(52) U.S. Cl. ........................ 137/574; 251/127; 220/563; 220/734
(58) Field of Search ..................... 137/574, 262; 220/563, 501, 553, 734; 251/127

(56) References Cited

U.S. PATENT DOCUMENTS

| | | |
|---|---|---|
| 2,678,660 | 5/1954 | Gurin . |
| 2,860,809 | * 11/1958 | Perry ..................................... 220/563 |
| 3,288,186 | 11/1966 | Headrick . |
| 3,653,531 | * 4/1972 | Zurmuehlen ...................... 220/563 X |
| 3,756,080 | * 9/1973 | Pringle ................................. 73/290 R |
| 4,214,443 | 7/1980 | Herenius . |
| 4,427,045 | 1/1984 | Headrick . |
| 4,464,057 | 8/1984 | Durrieu et al. . |
| 4,844,278 | 7/1989 | Freiwald et al. . |
| 5,236,605 | * 8/1993 | Warncke ............................... 210/799 |
| 5,718,298 | 2/1998 | Rusnak . |
| 5,779,092 | * 7/1998 | Hehn et al. ....................... 137/574 X |

OTHER PUBLICATIONS

Stephens, David G., *Flexible Baffles for Slosh Damping*, NASA Langley Research Center, Langley Station, Hampton, VA; vol. 3, No. 5.

Cole, Henry A., Jr., and Gambucci, Bruno J., Measured Two–Dimensional Damping Effectiveness of Fuel–Sloshing Baffles Applied to Ring Baffles In Cylindrical Tanks; NASA Technical Note, D–694, Ames Research Center, Moffett Field, CA, National Aeronautics and Space Administration, Office of Advanced Research and Technology (Code RVA), Washington, D.C., Feb. 1961.

Abramson, H.N., *Slosh Suppression*, NASA, National Aeronautics and Space Administration, Office of Advanced Research and Technology (Code RVA), Washington, D.C., May 1969.

* cited by examiner

*Primary Examiner*—Kevin Lee
(74) *Attorney, Agent, or Firm*—Alston & Bird, LLP

(57) ABSTRACT

There is provided a baffle for suppressing slosh in a tank adapted for containing fluids, and a tank for incorporating same. The baffle includes an attachment portion adapted to connect the baffle to an inner sidewall of the tank, and a baffle body extending from the attachment portion and adapted to protrude into the tank. A smoothly curved corrugation is provided for operably connecting the attachment portion and the baffle body. The baffle body can also include a plurality of ribs extending from a proximal edge of each baffle to a distal edge. A plurality of baffles are operably attached at different peripheral locations on an inner sidewall of the tank of the present invention in order to reduce slosh.

27 Claims, 4 Drawing Sheets

BAFFLE FOR SUPPRESSING SLOSH IN A TANK AND A TANK FOR INCORPORATING SAME

FIELD OF THE INVENTION

The present invention is directed to a baffle for suppressing slosh in a tank containing fluids and a tank for incorporating same.

BACKGROUND OF THE INVENTION

Launch vehicles used for space exploration use a large amount of liquid propellant while traveling through the earth's atmosphere and into outer space. Unlike long distance travel for many airplanes, there are no refueling stops or rendezvous with refueling aircraft in mid-flight for space vehicles. Therefore, launch vehicles used for space exploration must carry onboard all fuel necessary for propulsion and power generation for the entire voyage. This requirement means that launch vehicles must be equipped to store hundreds of thousands of pounds of liquid propellant, like liquid oxygen, and handle such propellant efficiently and safely.

One problem encountered with transporting large volumes of liquid fluids in launch vehicles is the sloshing of the fluids in the tanks. Slosh is caused by tank motions during travel and results in the production of forces that can affect launch vehicle stability and control. If the fluid is allowed to slosh freely in the tank, the moving fluid can have an adverse effect on the flight of the launch vehicle. For example, exciting the fluid above its natural frequency can result in oscillating, pendulum-like forces that can change the stability of the overall dynamic system of the vehicle. As is readily appreciated by those skilled in the art, sloshing fluids can produce forces that cause additional vehicle accelerations that, when responded to by the vehicle control system, form a closed loop that can lead to instability and, ultimately, structural failure. Consequently, the slosh must be suppressed.

Slosh suppression devices typically are used to damp liquid motions in the tanks of launch vehicles. Existing systems for slosh suppression primarily consist of a series of annular ring baffles arranged around the inner wall of the tank. These ring baffles run continuously around the periphery of the inside of the tank and are spaced apart by a given distance. The ring baffles are designed to not flex or bend with the moving fluid.

Numerous experiments have been performed on the effectiveness of various baffle designs. For example, NASA Technical Note D-694, dated February 1961, briefly discusses experiments involving the damping characteristics of semi-circular plates placed at given intervals around the inside of a tank. The technical note illustrates numerous different configurations for baffles that were tested. However, the experiments were aimed at gauging the effectiveness of the various baffle designs when incorporated with annular rings. The note finds that flat rings with a sharp edge are the most effective dampers for baffle depths greater than two chords.

Additionally, NASA Space Vehicle Design Criteria Report on Slosh Suppression SP-803, dated May 1969, and David G. Stephens article entitled "Flexible Baffles for Slosh Damping," *J. Spacecraft* (1965), discuss the use of flexible baffles to damp slosh in a tank. Both references conclude that flexible ring baffles could be used on space vehicles. However, as the Stephens article points out, a simple flat ring baffle was found to be the best damper of those tested. Although many different baffle designs have been experimented with in the past, including flexible baffles, the baffles adapted for actual use in launch vehicles continue to primarily consist of the rigid annular ring type design.

Rigid annular ring baffles have been successfully used to suppress slosh in the tank of a launch vehicle. However, ring baffles of this type add more than an insignificant amount of weight to the overall weight of the vehicle. For example, the Delta III rocket employs a rigid ring design that weighs approximately 400 pounds. In order to prevent the rocket from being unduly heavy, the weight devoted to the rigid ring design disadvantageously limits the weight of other items onboard the launch vehicles, such as the payload, the fuel and any other equipment.

SUMMARY OF THE INVENTION

It would be advantageous to provide a baffle for suppressing slosh in a tank that can sufficiently suppress slosh, while at the same time providing weight, material, and cost savings over ring baffles. It would also be advantageous to provide a tank for incorporating such a baffle.

The foregoing and other advantages are provided by the invention of an improved baffle for suppressing slosh in a tank adapted for containing fluids. The baffle includes an attachment portion adapted to connect the baffle to an inner sidewall of the tank, and a baffle body extending from the attachment portion and adapted to protrude into the tank.

According to one aspect of the invention, the baffle includes a smoothly curved corrugation operably connecting the attachment portion and the baffle body. For example, the smoothly curved corrugation operably connecting the attachment portion and the baffle body may be either S-shaped or U-shaped. In such an embodiment, the baffle body is permitted to flex relative to the attachment portion in response to movement of fluid within the tank. According to another aspect, the baffle body has a proximal edge, a distal edge opposite the proximal edge, and a plurality of ribs extending from the proximal edge to the distal edge. As such, the baffle body is advantageously stiffened without unnecessarily increasing its weight. According to either aspect, the baffle body may be semi-circular in shape. In addition, the baffle may further include a doubler extending along the attachment portion at an attachment lip. The doubler acts to alleviate stress in the attachment portion at attachment holes when the baffle is attached to the inner sidewall of the tank. Although not necessary, the doubler also can extend outwardly from the attachment portion and into the tank in two tongue-like projections at opposite ends of the doubler in order to provide added reinforcement.

The tank of the present invention includes a plurality of baffles operably attached to at least one sidewall that at least partially defines an internal cavity for housing fluids. The plurality of baffles extend into the internal cavity defined by the at least one sidewall and comprise first and second baffles disposed at first and second heights, respectively, within the tank. Preferably, the first and second heights are different. Each baffle extends along only a portion of a perimeter of the at least one sidewall, and the first and second baffles are disposed at different peripheral locations within the tank to further suppress the slosh. The plurality of baffles may also be operably connected to each other by a connecting member to ensure that the baffles move in concert.

According to the present invention, an improved baffle is provided to effectively limit slosh within a tank that weighs less than conventional ring baffles. As such, the overall weight of the launch vehicle can be advantageously reduced or additional payload or fuel can be carried without increasing the overall weight of the launch vehicle. However, the baffle of the present invention can be designed such that slosh is suppressed as well or better than the suppression provided by ring baffles, even though the overall weight of the baffles is significantly reduced.

BRIEF DESCRIPTION OF THE DRAWINGS

The advantages and features of the disclosed invention will readily be appreciated by persons skilled in the art from the following detailed description when read in conjunction with the drawings wherein.

DETAILED DESCRIPTION OF THE INVENTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Figure 1:
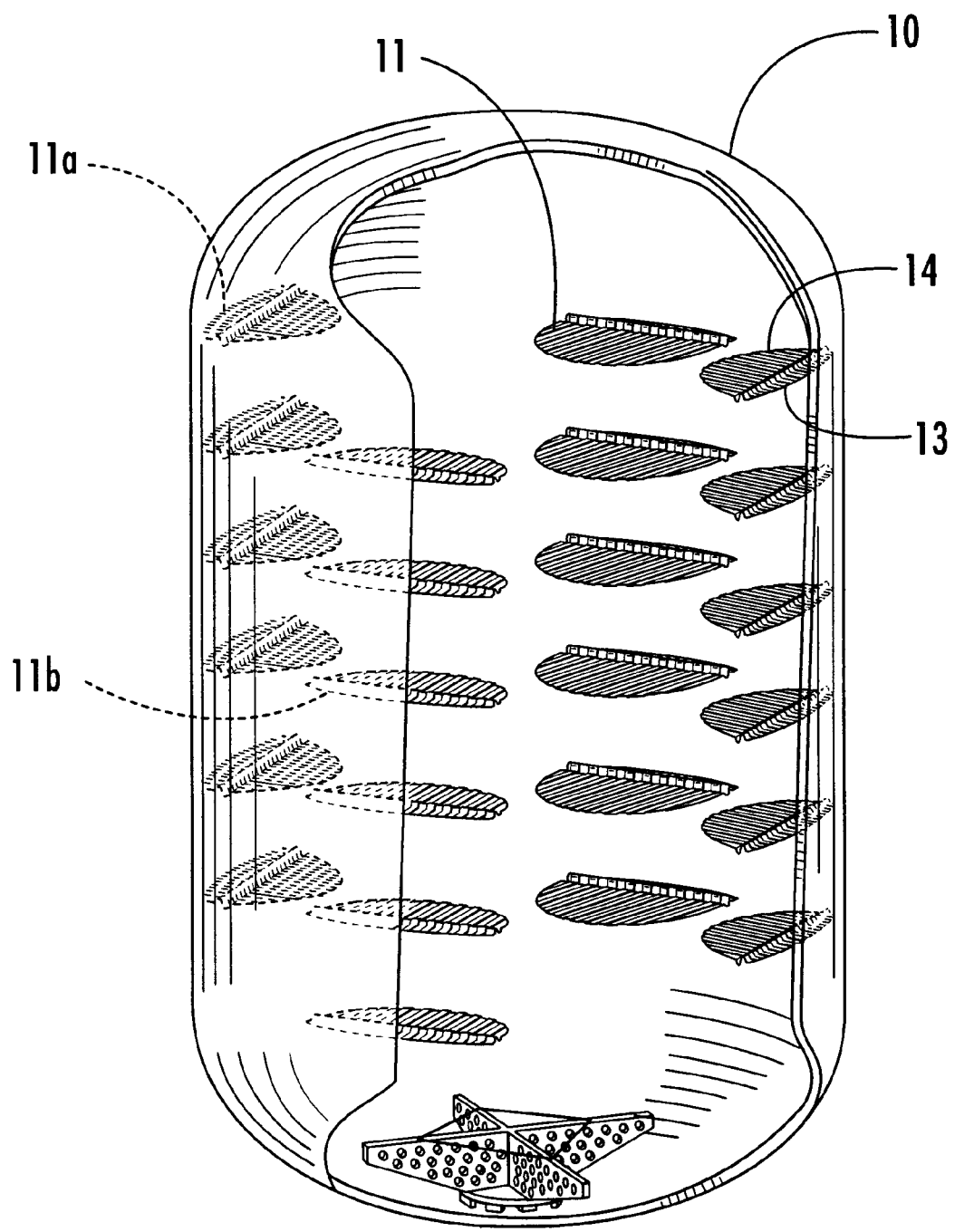
FIG. 1 is a schematic view of a tank according to one embodiment of the present invention in which the outer walls of the tank are transparent showing an arrangement of baffles in a tank.

Referring now to FIG. 1, a tank 10 is set forth therein in cross-section in accordance with the present invention. Tanks of the present invention can be employed in many applications in which slosh is disadvantageous such as for operation in launch vehicles, and more particularly, for use in launch vehicles designed for space missions. The tank shown is cylindrical in shape, although the present invention could be adapted to a differently shaped tank and is not meant to be limited to a cylindrical tank. In use, fluid is transported in the tank. The fluid commonly is a liquid propellant such as liquid oxygen in which case the tank is a fuel tank, although it should be understood that the present invention is not limited by the type of fluid that may be transported in the tank.

The tank 10 of the present invention usually includes a plurality of baffles 11 arranged around the periphery of the inside of the tank. As will be apparent to those skilled in the art, the plurality of baffles can be sized to effectively damp the slosh characteristics of fluid in any given tank. For example, for a tank that stores liquid oxygen sized approximately 99 inches in radius and 210 inches in length with domed ends, twenty-four semi-circular baffles, each having a radius of approximately thirty inches and weighing approximately six pounds each, are anticipated to effectively suppress slosh within the tank.

The baffles are mounted at different locations within the tank. In one advantageous embodiment, shown in FIG. 1, the plurality of baffles 11 are arranged in longitudinal rows or stacks at evenly-spaced locations around the periphery of the inside of the tank. However, the baffles need not be arranged in stacks, but can be staggered or otherwise positioned in an uneven manner within the tank. In addition, while each baffle can move independently, a plurality of baffles can also be connected so as to move in concert. For example, each baffle in a given stack of baffles can be connected together by a connecting member (not shown), such as a rigid tube. The rigid tube is formed of a material that is capable of withstanding submersion in liquid, especially liquid propellant, and is compatible with the liquid stored and transported in the tank such that the rigid tube maintains its rigidity while in use. Preferably, the rigid tube is made of hollow extruded aluminum or graphite composite epoxy and is attached to a plurality of the baffles extending into the tank. When connected by the rigid tube, each baffle of a stack moves in concert with the other baffles to which it is attached and acts in unison to suppress the slosh created by the moving fluid in the tank.

Each baffle is comprised of an attachment portion 13 and a baffle body 14 extending from the attachment portion into the tank. The attachment portion 13 is adapted to connect the baffle to an inner sidewall of the tank of the present invention. The baffle of the present invention is preferably one continuous member and is made from sheet metal, such as aluminum 7075 of 0.032 inch thickness, although the baffle can be formed of other materials and can have other thicknesses if so desired.

Figure 2:
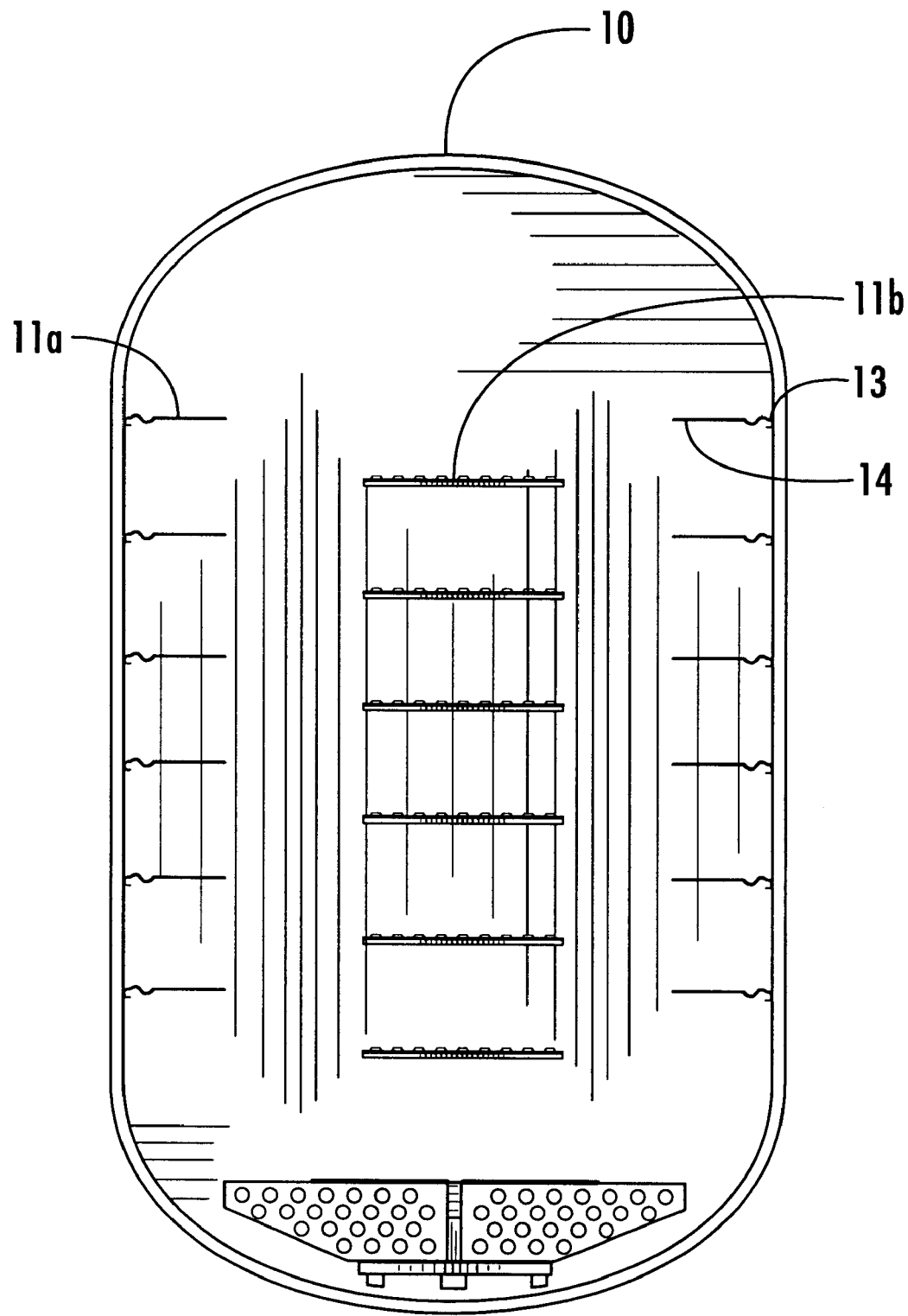
FIG. 2 is a cross section of a tank according to one embodiment of the present invention showing an arrangement of baffles in a tank.

In one advantageous embodiment, the tank includes four longitudinal rows or stacks of baffles arranged into equal angular increments, i.e., 90° increments, around the periphery of the inner wall of the tank. However, a tank of the present invention can include different numbers of stacks of baffles spaced at different angular increments, including both even and uneven angular increments, about the periphery of the inner wall of the tank. Additionally, the baffles need not be mounted at the same heights within the tank. In fact, as shown in FIG. 1, the tank of one advantageous embodiment includes at least two stacks of baffles with each baffle of a first stack 11a being mounted at a different height than the baffles of the second stack 11b. For example, as shown more clearly in FIG. 2, each baffle of the first stack 11a can be mounted at a height that is approximately halfway between the respective heights of a pair of baffles of the second stack 11b. However, the baffles can be mounted at other relative heights within the tank without departing from the spirit and scope of the present invention.

Figure 3:
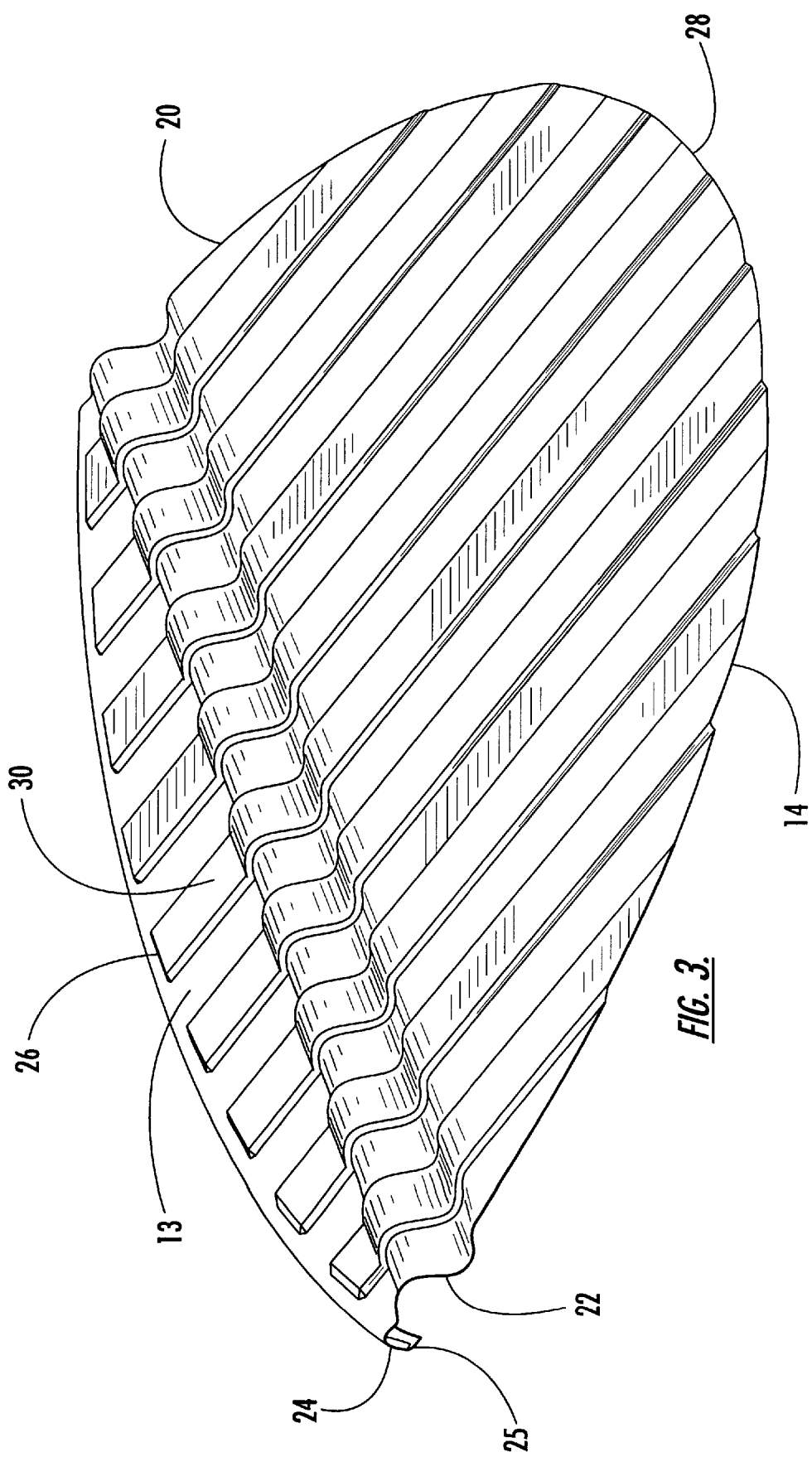
FIG. 3 is a perspective view of a semi-circular shaped baffle according to one embodiment of the present invention having an attachment portion, a baffle body, and a smoothly curved corrugation in an S-shape operably connecting the attachment portion and the baffle body, whereby the baffle includes a plurality of ribs extending along the baffle body.

Shown in FIG. 3 is a baffle 20 of the present invention with a semi-circular shaped baffle body 14. However, the baffle body can have other shapes, if so desired. As shown in FIG. 3, a smoothly curved corrugation 22 formed in the shape of an "S" connects the attachment portion 13 of the baffle 20 to the baffle body 14. The purpose of the smoothly curved corrugation 22 is to limit bending of the baffle laterally across the baffle. When the fluid in the tank is set in motion, each baffle is capable of flexing along the baffle in response to forces exerted by the moving fluid in the tank, thereby at least partially suppressing slosh within the tank. While an S-shaped corrugation is depicted, the smoothly curved corrugation 22 can have any shape that allows for flexibility of the baffle while providing stiffening laterally across the baffle. For example, the smoothly curved corrugation can be in the shape of a "U." In addition to having any one of several different shapes, the smoothly curved corrugation 22 can have different sizes and can vary in curvature and still effectively limit bending of the baffle laterally across the baffle while allowing the baffle to flex along the baffle to at least partially suppress slosh within the tank.

Figure 4:
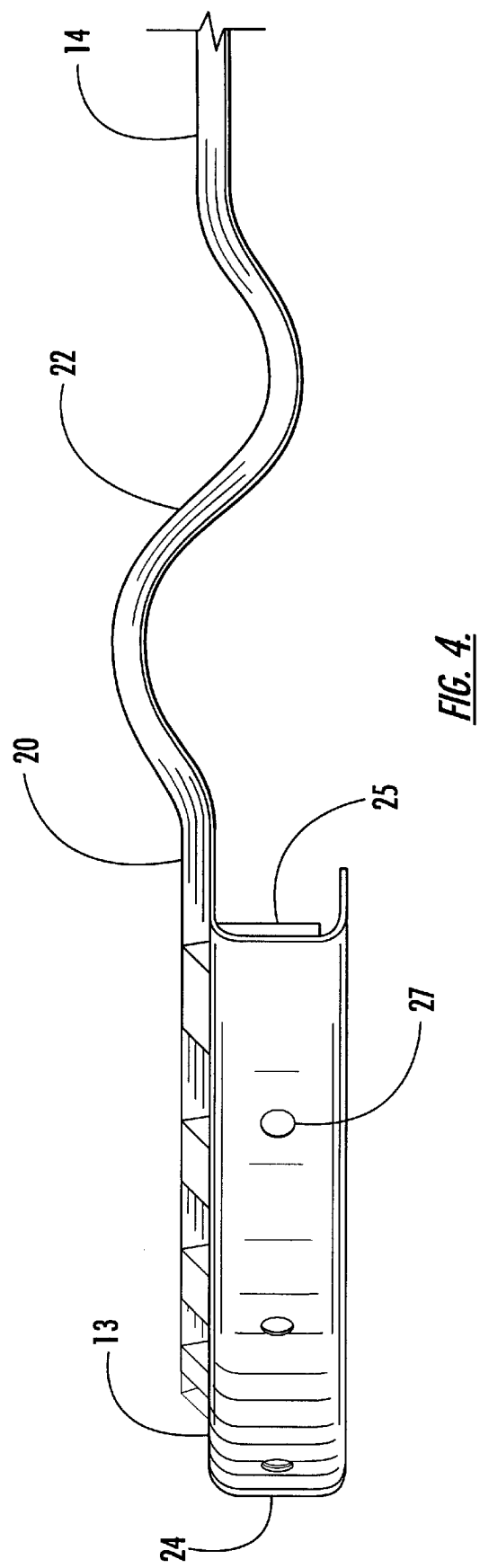
FIG. 4 is a fragmentary perspective view showing a baffle according to one embodiment of the present invention that includes a smoothly curved corrugation in an S-shape and a doubler extending along the attachment portion that forms the attachment lip.

The attachment portion 13 of the baffle is also shown in FIG. 4. The attachment portion is located opposite the baffle body 14 relative to the corrugation 22 and is adapted so that the baffle 20 can be securely connected to an inner sidewall of the tank. In an advantageous embodiment, the attachment portion 13 comprises an attachment flange or lip 24 fashioned continuously from the material that forms the rest of the baffle. The attachment lip 24 is shaped by bending a portion of the baffle that makes up the attachment portion 13 to form a surface substantially perpendicular to the baffle body 14 and substantially corresponding to the shape of the inner wall of the tank. When abutted to an inner sidewall of the tank, the attachment lip 24 of the attachment portion 13 of the baffle 20 can be operably connected to the tank and, more typically, to isogrid nodes. Mounting or attachment holes 27, shown in FIG. 4, or other suitable apertures can be provided in the attachment lip portion to allow for connection of the baffle to the tank or the isogrid within the tank.

Although not necessary for the practice of the present invention, the baffle can also include a doubler 25 extending along the attachment portion 13 that forms the attachment lip 24 on the inner surface opposite the tank wall, as shown in FIGS. 3 and 4. The doubler 25 is formed to follow the substantially perpendicular surface that comprises the attachment lip 24. The purpose of the doubler 25 is to reinforce the attachment portion 23 of the baffle 20 by alleviating stress along the attachment lip 24 at the attachment holes 27 created when the baffle is operably connected to the inner sidewall of the tank. The doubler 25 is most advantageously one continuous piece placed along the attachment lip of the attachment portion and contains suitable apertures for allowing for the baffle to be operably connected to the inner sidewall of the tank. The doubler can have any thickness and can be made from any material that is capable of withstanding fatigue during use and that can tolerate immersion in liquid, especially liquid propellant. One advantageous embodiment is to make the doubler from the same material and of the same thickness as the remainder of the baffle to which the doubler is attached. The doubler can include two tongue-like projections (not shown) located at opposite ends of the doubler that track the bend in the attachment portion and extend outwardly toward the baffle body.

According to one advantageous embodiment, the baffle of the present invention includes a plurality of ribs 30 formed on the surface of each baffle, as shown in FIG. 3. Typically, the plurality of ribs 30 are added to the baffle to increase bending stiffness, thereby further suppressing slosh in the tank without excessively increasing the weight of the baffle. The ribs 30 are generally elevated relative to the remainder of the surface of the baffle and are arranged at substantially evenly spaced intervals on the baffle surface. However, the ribs can be formed at irregular intervals across the surface of the baffle, if so desired. In order not to interfere with the attachment lip 24 of the attachment portion 13, the ribs 30 preferably extend from a distal end 28 of the baffle body up to a point proximate to and just short of the point of attachment of the attachment portion 13 to an inner sidewall of the tank. For example, as shown in FIG. 3, each rib extends along the surface of the baffle to a point that is a fraction of an inch from the bend in the attachment portion 13 that forms the attachment lip 24. The proximal end 26 of each rib, i.e., the end of the rib proximate the attachment lip 24, is then chamfered downwardly to the surface of the baffle.

The ribs 30 can be formed in different manners. For a baffle formed of sheet metal, for example, the baffle body can be stamped to define the ribs extending between proximal and distal ends of the baffle. Regardless of the manner in which the baffle is formed, the addition of ribs to the baffle of the present invention allows for a thinner, and therefore lighter, material to be used to form the baffle while not compromising any damping characteristics of the baffle. As will be understood by those skilled in the art, increasing the relative height of each rib above the surface of the baffle acts to increase the baffle stiffness. The respective height and spacing of the ribs can be varied to tune the stiffness of the baffle to achieve the desired slosh suppression characteristics for a particular application in a given tank.

By way of example, it is anticipated that the rigid ring design that is employed by the Delta III rocket that weighs about 400 pounds could be replaced by flexible baffles of the present invention that provide the same slosh suppression while weighing only about 150 pounds, a weight savings of about 250 pounds. In addition, the baffles of the present invention are also believed to contain less overall parts and be easier to mount within the tank than conventional rigid ring baffles, thereby also saving significantly on installation labor time and cost.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A baffle for suppressing slosh in a tank adapted for containing fluids, the baffle comprising:

an attachment portion adapted to connect the baffle to an inner sidewall of the tank;

a baffle body extending from said attachment portion and adapted to protrude into the tank, wherein the baffle body is semi-circular in shape; and a smoothly curved corrugation operably connecting said attachment portion and said baffle body such that said baffle body is permitted to flex relative to said attachment portion in response to movement of fluid within the tank, thereby suppressing slosh within the tank.

2. A baffle according to claim 1 wherein the baffle is one continuous member.

3. A baffle for suppressing slosh in a tank adapted for containing fluids, the baffle comprising:

an attachment portion adapted to connect the baffle to an inner sidewall of the tank;

a doubler extending along at least a portion of the attachment portion;

a baffle body extending from said attachment portion and adapted to protrude into the tank; and a smoothly curved corrugation operably connecting said attachment portion and said baffle body such that said baffle body is permitted to flex relative to said attachment portion in response to movement of fluid within the tank, thereby suppressing slosh within the tank.

4. A baffle according to claim 2 wherein at least a portion of the smoothly curved corrugation is S-shaped.

5. A baffle according to claim 2 wherein at least a portion of the smoothly curved corrugation is U-shaped.

6. A baffle according to claim 3 wherein the baffle is one continuous member.

7. A baffle according to claim 3 wherein at least a portion of the smoothly curved corrugation is S-shaped.

8. A baffle according to claim 3 wherein at least a portion of the smoothly curved corrugation is U-shaped.

9. A baffle for suppressing slosh in a tank adapted for containing fluids, the baffle comprising:

an attachment portion adapted to connect the baffle to an inner sidewall of the tank;

a baffle body extending from said attachment portion and adapted to protrude into the tank, wherein the baffle body has a proximal edge, a distal edge opposite the proximal edge, and a plurality of ribs extending from the proximal edge to the distal edge; and a smoothly curved corrugation operably connecting said attachment portion and said baffle body such that said baffle body is permitted to flex relative to said attachment portion in response to movement of fluid within the tank, thereby suppressing slosh within the tank.

10. A baffle according to claim 9 wherein the baffle is one continuous member.

11. A baffle according to claim 9 wherein at least a portion of the smoothly curved corrugation is S-shaped.

12. A baffle according to claim 9 wherein at least a portion of the smoothly curved corrugation is U-shaped.

13. A baffle for suppressing slosh in a tank adapted for containing fluids, the baffle comprising:

an attachment portion adapted to connect the baffle to an inner sidewall of the tank; and a baffle body extending from said attachment portion and adapted to protrude into the tank, wherein said baffle body has a proximal edge, a distal edge opposite the proximal edge, and a plurality of ribs extending from the proximal edge to the distal edge.

14. A baffle according to claim 13 further comprising a smoothly curved corrugation operably connecting the attachment portion and the baffle body such that the baffle body is permitted to flex relative to the attachment portion in response to movement of fluid within the tank, thereby suppressing slosh within the tank.

15. A baffle according to claim 14 wherein at least a portion of the smoothly curved corrugation is S-shaped.

16. A baffle according to claim 14 wherein at least a portion of the smoothly curved corrugation is U-shaped.

17. A baffle according to claim 13 wherein said baffle body is semi-circular in shape.

18. A baffle according to claim 13 further comprising a doubler extending along at least a portion of the attachment portion.

19. A baffle according to claim 13 wherein the baffle is one continuous member.

20. A tank adapted to contain fluids, the tank comprising:

at least one sidewall that at least partially defines an internal cavity for housing the fluids; and a plurality of baffles operably attached to said at least one sidewall and extending into the internal cavity defined thereby, wherein each baffle extends along only a portion of a perimeter of said at least one sidewall, wherein said plurality of baffles comprise first and second baffles disposed at first and second heights, respectively, within the tank with first and second heights being different, and wherein said first and second baffles are disposed at different peripheral locations within the tank, wherein each baffle comprises an attachment portion adapted to connect the baffle to an inner sidewall of the tank, and a baffle body extending from said attachment portion and adapted to protrude into the tank, and wherein each baffle further comprises a smoothly curved corrugation operably connecting said attachment portion and said baffle body such that said baffle body is permitted to flex relative to said attachment portion in response to movement of fluid within the tank, thereby suppressing slosh within the tank.

21. A tank according to claim 20 wherein at least a portion of the smoothly curved corrugation of each baffle is S-shaped.

22. A tank according to claim 20 wherein at least a portion of the smoothly curved corrugation of each baffle is U-shaped.

23. A tank according to claim 20 wherein each baffle body is semicircular in shape.

24. A tank according to claim 20 wherein each baffle further comprises a doubler extending along at least a portion of the attachment portion.

25. A tank according to claim 20 wherein each baffle is one continuous member.

26. A tank adapted to contain fluids, the tank comprising:

at least one sidewall that at least partially defines an internal cavity for housing the fluids; and a plurality of baffles operably attached to said at least one sidewall and extending into the internal cavity defined thereby, wherein each baffle extends along only a portion of a perimeter of said at least one sidewall, wherein said plurality of baffles comprise first and second baffles disposed at first and second heights, respectively, within the tank with first and second heights being different, and wherein said first and second baffles are disposed at different peripheral locations within the tank, wherein each baffle comprises an attachment portion adapted to connect the baffle to an inner sidewall of the tank, and a baffle body extending from said attachment portion and adapted to protrude into the tank, and wherein said baffle body has a proximal edge, a distal edge opposite the proximal edge, and a plurality of ribs extending from the proximal edge to the distal edge.

27. A tank according to claim 26 wherein each baffle is one continuous member.

* * * * *

UNITED STATES PATENT AND TRADEMARK OFFICE
CERTIFICATE OF CORRECTION

PATENT NO.   : 6,220,287 B1
DATED        : April 24, 2001
INVENTOR(S)  : Wolf

It is certified that error appears in the above-identified patent and that said Letters Patent is hereby corrected as shown below:

Column 7,
Lines 4 and 6, "claim 2" should read -- claim 1 --.

Signed and Sealed this

Eleventh Day of December, 2001

*Attest:*

NICHOLAS P. GODICI
*Attesting Officer*     *Acting Director of the United States Patent and Trademark Office*